United States Patent [19]

Ailliet et al.

[11] Patent Number: 4,770,984

[45] Date of Patent: Sep. 13, 1988

[54] COLOR PHOTOGRAPHIC FILM ELEMENT WITH BLUE AND YELLOW ANTIHALATION LAYERS

[75] Inventors: Marc W. Ailliet, Brecht; Felix J. Moelants, Wilrijk; Ronnie G. Mampaey, Kontich, all of Belgium

[73] Assignee: Agfa-Gevaert, N.V., Morstel, Belgium

[21] Appl. No.: 70,921

[22] Filed: Jul. 8, 1987

[51] Int. Cl.$^4$ ............................ G03C 1/84; G03C 7/20
[52] U.S. Cl. ...................................... 430/505; 430/507; 430/517; 430/522
[58] Field of Search ................. 430/505, 507, 517, 522

[56] References Cited

U.S. PATENT DOCUMENTS

| | | | |
|---|---|---|---|
| 2,697,037 | 12/1954 | Jelley et al. | 430/507 |
| 3,247,127 | 4/1966 | Bailey | 430/507 |
| 3,672,898 | 6/1972 | Schwan et al. | 430/507 |
| 4,266,014 | 5/1981 | Moelants et al. | 430/522 |
| 4,288,534 | 9/1981 | Lemahiev et al. | 430/522 |

*Primary Examiner*—Richard L. Schilling
*Attorney, Agent, or Firm*—A. W. Breiner

[57] ABSTRACT

Color photographic motion picture projection film element comprising a transparent film support and coated thereon in succession, a blue-sensitive silver halide emulsion layer comprising a yellow-forming coupler, a red-sensitized silver halide emulsion layer comprising a cyan-forming coupler, an intermediate layer, a green-sensitized silver halide emulsion layer comprising a magenta-forming coupler, and an antistress layer, wherein between said support and said blue-sensitive silver halide emulsion layer a yellow antihalation undercoat is provided, which comprises at least one yellow non-diffusing dye that absorbs blue light and is removable and/or decolorizable in a processing bath and between said blue-sensitive silver halide emulsion layer and said red-sensitized silver halide emulsion layer a bluish antihalation intermediate layer is provided, which comprises at least one blue non-diffusing dye that absorbs red light and is removable and/or decolorizable in a processing bath.

10 Claims, No Drawings

COLOR PHOTOGRAPHIC FILM ELEMENT WITH BLUE AND YELLOW ANTIHALATION LAYERS

DESCRIPTION

The present invention relates to colour photographic motion picture projection film elements comprising light-absorbing antihalation layers.

Colour photographic motion picture projection film elements are multilayer colour print film elements intended for making colour release prints. They basically consist of a transparent film support carrying in the given order a blue-sensitive silver halide emulsion layer, a red-sensitized silver halide emulsion layer, and a green-sensitized silver halide emulsion layer. Between the emulsion layers intermediate layers of a hydrophilic colloid, mostly gelatin, are provided for better colour separation. The side of the transparent film support opposite to that carrying the emulsion layers is coated with a carbon black antihalation back layer. A carbon black antihalation back layer indeed provides excellent halation protection and has excellent antistatic properties.

Unfortunately, carbon black has the disadvantage of getting loose easily from the antihalation back layer, thus creating dust that smears the photographic element and exerts a disturbing influence during the imagewise exposure thereof. Moreover, the removal of the carbon black antihalation back layer, which is to take place before the colour development can be started, is rather cumbersome.

To avoid disadvantages concurrent with the use of carbon black antihalation back layers in colour photographic motion picture projection film elements, one can make use of antihalation dyes in these elements in the same way as it is done in other types of photographic elements, in which one or several antihalation dyes having light absorption spectra depending on the spectral sensitivity of the light-sensitive layers are employed. It is for instance known to use in a panchromatic graphic arts material a combination of antihalation dyes, which absorb in the entire visible spectral range.

Attempts to use in colour photographic motion picture projection film elements a combination of antihalation dyes, which can absorb light of the entire visible spectral range, meet with several difficulties.

When used in a so-called antihalation undercoat, which is a layer between the transparent film support and the blue-sensitive emulsion layer, each individual dye of the light-absorbing dyes that together provide the desired composite absorption spectrum has to be entirely non-diffusing to other colloid layers. Unfortunately, it is experienced that in combinations of dyes that together provide the desired composite absorption spectrum, often at least one is not entirely fast to diffusion and as a consequence migrates at least partially to the adjacent blue-sensitive emulsion layer and may sensitize this emulsion layer to an unwanted part of the spectrum e.g. to red light so that unwanted colour densities are obtained after the processing.

An intermediate emulsion layer provided between the antihalation undercoat and the blue-sensitive emulsion layer is not found to be capable of intercepting migrating antihalation dye.

Another problem linked with the use of a combination of several dyes in an antihalation undercoat, is that it is extremely difficult to find a group of dyes that together provide the desired composite absorption spectrum, while at the same time each of these dyes should individually comply with the necessity of being completely removable and/or decolourizable in at least one of the processing baths. Residual colour frequently remains after processing, which results in an increased minimum density.

Replacing the carbon black antihalation back layer by an antihalation dye back layer, would result in the advantage that the support, which constitutes a bar between the antihalation back layer and the blue-sensitive emulsion layer, prevents the dye(s) from diffusing. However, this means that a dye-containing layer has to be coated on the rear side of the support, which may cause difficulties with respect to the antistatic properties. Moreover, a colour photographic motion picture projection film element carrying such a dye-containing layer may have an increased tendency of sticking and be liable to scratching. Furthermore, the side of the support that is to carry the dye-containing layer may have to be subbed first with a supplemental coating to improve the adhesion.

It is known from U.S. Pat. No. 2,697,037 to provide a blue intermediate layer between the blue-sensitive and the red-sensitive emulsion layers to reduce the reflection of red or green light by the blue-sensitive layer.

It is an object of the present invention to provide a colour photographic motion picture projection film element that does not suffer from the disadvantages of a carbon black antihalation back layer and still offers its advantages of a high level of image sharpness.

This object can be accomplished according to the present invention by providing a colour photographic motion picture projection film element comprising a transparent film support and coated thereon in succession, a blue-sensitive silver halide emulsion layer comprising a yellow-forming coupler, a red-sensitized silver halide emulsion layer comprising a cyan-forming coupler, an intermediate layer, a green-sensitized silver halide emulsion layer comprising a magenta-forming coupler, and an antistress layer, characterized in that between said support and said blue-sensitive silver halide emulsion layer a yellow antihalation undercoat is provided, which comprises at least one yellow non-diffusing dye that absorbs blue light and is removable and/or decolourizable in a processing bath and that between said blue-sensitive silver halide emulsion layer and said red-sensitized silver halide emulsion layer a bluish antihalation intermediate layer is provided, which comprises at least one blue non-diffusing dye that absorbs red light and is removable and/or decolourizable in a processing bath.

According to a preferential embodiment the present invention provides a colour photographic motion picture projection film element comprising a transparent film support and coated thereon in succession, a blue-sensitive silver halide emulsion layer comprising a yellow-forming coupler, a red-sensitized silver halide emulsion layer comprising a cyan-forming coupler, an intermediate layer, a green-sensitized silver halide emulsion layer comprising a magenta-forming coupler, and an antistress layer, characterized in that between said support and said blue-sensitive silver halide emulsion layer a yellow antihalation undercoat is provided, which comprises a yellow non-diffusing dye that absorbs blue light and is removable and/or decolourizable in a processing bath, said yellow non-diffusing dye being at least on dye chosen from the group consisting of:

a merostyryl dye corresponding to the general formula (I):

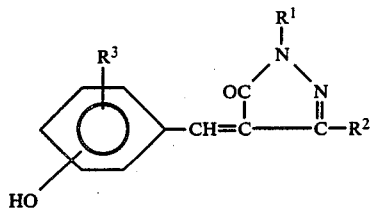

in which:
R¹ represents hydrogen, a $C_1$-$C_4$ alkyl group, e.g. methyl, isopropyl, butyl, a substituted $C_1$-$C_4$ alkyl group such as $C_1$-$C_4$ alkyl substituted with a halogen atom, hydroxy, carboxy, cyano e.g. trifluoroethyl, hydroxyethyl, carboxymethyl, cyanoethyl, an aryl group e.g. phenyl, a substituted aryl group e.g. tolyl, carboxyphenyl, dicarboxyphenyl, an aralkyl group, a substituted aralkyl group, or a heterocyclic group, R² represents one of the groups represented by R¹, a carboxy group, an alkoxycarbonyl group, an aryloxycarbonyl group, a carbamoyl group, an ureido group, or a sulphamoyl group, at least one of R¹ and R² being or containing a carboxy group or a carbamoyl group, preferably carboxyphenyl or dicarboxyphenyl, R³ represents hydrogen, a $C_1$-$C_4$ alkyl group, or a $C_1$-$C_4$ alkoxy group e.g. methoxy, and when R³ is a $C_1$-$C_4$ alkyl group or a $C_1$-$C_4$ alkoxy group, it stands in ortho- or para-position in respect of the hydroxy group, which itself is in ortho- or para-position in respect of the methine group, and a monomethine oxonol dye corresponding to the following general formula (II):

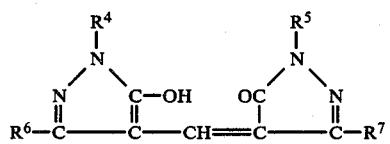

in which:
each of R⁴ and R⁵, which may be the same or different, represents: hydrogen, a $C_1$-$C_4$ alkyl group e.g. t-butyl, a substituted $C_1$-$C_4$ alkyl group e.g. 2-trifluoroethyl, an aryl group e.g. phenyl, a substituted aryl group e.g. carboxyphenyl and dicarboxyphenyl, or a heterocyclic group e.g. 3-sulfolanyl, each of R⁶ and R⁷, which may be the same or different, represents: a $C_1$-$C_4$ alkyl group e.g. methyl, a carboxy group, or a carbamoyl group, at least one of R⁴, R⁵, R⁶, and R⁷ being or containing carboxy or carbamoyl, and that between said blue-sensitive silver halide emulsion layer and said red-sensitized silver halide emulsion layer a bluish antihalation intermediate layer is provided, which comprises a blue non-diffusing dye that absorbs red light and is removable and/or decolourizable in a processing bath, said blue non-diffusing dye being at least one pentamethine oxonol-type barbituric acid derivative dye corresponding to the general formula (III):

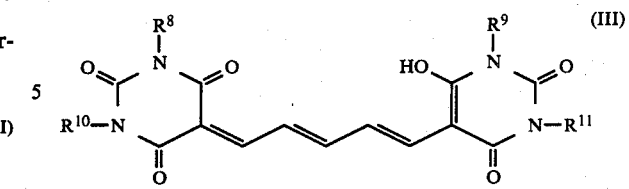

in which:
each of R⁸ and R⁹, which may be the same or different, represents: hydrogen, a $C_1$-$C_4$ alkyl group e.g. n-butyl, a substituted $C_1$-$C_4$ alkyl group, a $C_1$-$C_4$ alkoxy group, an aryl group e.g. phenyl, or a substituted aryl group such as phenyl substituted with at least one substituent chosen from the group consisting of a halogen atom, hydroxy, alkyl, alkoxy, carboxy, carbamoyl, sulphamoyl, alkoxycarbonyl, aryloxycarbonyl, alkoxysulphonyl, aryloxysulphonyl, and heterocyclylsulphonyl, e.g. o-sulphamoylphenyl, p-methoxyphenyl, and 3-hydroxy-4-carboxyphenyl, and each of R¹⁰ and R¹¹, which may be the same or different, represents: one of the groups represented by R⁸ and R⁹, or a cycloalkyl group e.g. cyclohexyl.

The expressions "a blue-sensitive silver halide emulsion layer", "a red-sensitive silver halide emulsion layer", and a "green-sensitized silver halide emulsion layer" as used herein are meant to include more than one of each of these silver halide emulsion layers.

It has been established that the image sharpness obtained with a colour photographic motion picture projection film element of the present invention comprising at the same time the yellow antihalation undercoat and the bluish antihalation intermediate layer as described above at least equals the sharpness obtained with a comparable known film element comprising a carbon black antihalation back layer. Especially the image sharpness obtained in the red-sensitized emulsion layer of a film element of the present invention is found to surpass the image sharpness obtained in the red-sensitized emulsion layer of a comparable film element comprising a carbon black antihalation back layer.

The merostyryl dyes corresponding to the above general formula I and the monomethine oxonol dyes corresponding to the above general formula (II) as well as the pentamethine oxonol-type barbituric acid derivative dyes corresponding to the above general formula (III) are preferably used in dispersed state in a hydrophilic colloid, since in such state they show a broad and fairly uniform absorption spectrum. These dyes meet the demands made on light-absorbing dyes for photographic silver halide elements. They are readily compatible with photographic binders such as e.g. gelatin and they can easily be incorporated into the photographic element. Moreover, they possess a high absorptive power. Below a pH-value of 7 they do not migrate in hydrophilic colloid layers and do not dissolve in water, whereas they dissolve readily in water above pH 7. Although during processing they decolour very quickly, even in rapid processing, they are very stable in coating compositions. Furthermove, they are discharged quickly, completely, and irreversibly in an alkaline processing solution, e.g. a developing solution, without forming coloured degradation products, so that there is no residual colour in the material after the processing, nor in the processing liquid.

In the following Table 1 a non-restrictive list of representative examples of merostyryl dyes, which can be used according to the present invention, is given. The symbols refer to the general formula I.

TABLE 1

Yellow merostyryl dyes

| Dye N° | R¹ | R² | R³ | Position of —OH |
|---|---|---|---|---|
| YM-01 | p-carboxyphenyl | methyl | m-methoxy | para |
| YM-02 | p-carboxyphenyl | methyl | m-methoxy | ortho |
| YM-03 | p-carboxyphenyl | methyl | hydrogen | para |
| YM-04 | p-carboxyphenyl | methyl | hydrogen | ortho |
| YM-05 | p-carboxyphenyl | ethoxy-carbonyl | hydrogen | para |
| YM-06 | phenyl | carboxy | hydrogen | para |
| YM-07 | trifluoroethyl | carbamoyl | hydrogen | para |
| YM-08 | phenyl | carbomoyl | hydrogen | para |

The merostyryl dyes for use in accordance with the present invention can be prepared as described in the above-mentioned U.S. Pat. No. 4,311,787.

The absorption characteristics of the merostyryl dyes of Table 1 are listed in the following Table 2. The absorption maxima measured in a non-polar solvent (e.g. methanol) vary between about 380 and 440 nm, whereas in a mixture of a non-polar solvent and a base (e.g. triethylamine) or in a polar solvent (e.g. dimethylformamide) an absorption maximum shifted bathochromically by up to 100 nm is obtained. When measured in dispersed state in gelatin the absorption maximum of these merostyryl dyes was found to have shifted hypsochromically, the absorption spectrum being broader and more uniform, which is most advantageous for use according to the present invention.

TABLE 2

| Dye no. | Absorption maximum (in nm) | $\epsilon \times 10^{-4}$ | measured in |
|---|---|---|---|
| YM-01 | 392 | 3.64 | methanol |
| YM-02 | 434 | 2.67 | methanol |
| YM-03 | 472 | 4.7 | methanol/triethylamine |
| YM-04 | 384 | 1.55 | methanol |
| YM-05 | 498 | 3.65 | methanol/triethylamine |
| YM-06 | 482 | 2.89 | methanol/triethylamine |
| YM-07 | 498 | 7.13 | dimethylformamide |
| YM-08 | 498 | 5.89 | dimethylformamide |

According to a preferred embodiment of the present invention the dye YM-03 listed in Table 1 is used as merostyryl dye in dispersed state in the yellow antihalation undercoat, preferably a gelatin-containing antihalation undercoat, between the support and the blue-sensitive emulsion layer.

In the following Table 3 a non-restrictive list of representative examples of yellow monomethine oxonol dyes corresponding to the general formula (II), which can be used according to the present invention, is given. The symbols refer to the general formula II.

TABLE 3

Yellow monomethine oxonol dyes

| Dye N° | R⁴ | R⁵ | R⁶ | R⁷ |
|---|---|---|---|---|
| YO-01 | phenyl | phenyl | carboxy | carboxy |
| YO-02 | p-carboxy-phenyl | p-carboxy-phenyl | methyl | methyl |
| YO-03 | t-butyl | t-butyl | carboxy | carboxy |
| YO-04 | trifluoroethyl | trifluoroethyl | carboxy | carboxy |
| YO-05 | 3,5-dicarboxy-phenyl | 3,5-dicarboxy-phenyl | methyl | methyl |
| YO-06 | 3-sulfolanyl | 3-sulfolanyl | carbamoyl | carbamoyl |

The yellow monomethine oxonol dyes corresponding to the general formula (II), which can be used according to the present invention, can be prepared according to methods known in the art; reference can be made in this respect to U.S. Pat. Nos. 4,092,168, 4,266,014, and 4,288,534.

The absorption characteristics of the monomethine oxonol dyes of Table 3 are listed in the following Table 4.

TABLE 4

| Dye no. | Absorption maximum (in nm) | $\epsilon \times 10^{-4}$ | measured in |
|---|---|---|---|
| YO-01 | 415 | 1.93 | methanol |
| YO-02 | 410 | 2.72 | methanol |
| YO-03 | 415 | 2.20 | methanol |
| YO-04 | 415 | 2.30 | methanol |
| YO-05 | 446 | 2.88 | dimethylformamide |
| YO-06 | 480 | 2.20 | dimethylformamide |

In the following Table 5 a non-restrictive list of representative examples of blue pentamethine oxonol-type barbituric acid derivatives corresponding to the general formula (III), which can be used according to the present invention, is given. The symbols refer to the general formula III.

TABLE 5

Blue pentamethine oxonol-type barbituric acid derivative dyes

| Dye N° | R⁸ and R⁹ | R¹⁰ and R¹¹ |
|---|---|---|
| B-01 | hydrogen | p-methoxyphenyl |
| B-02 | hydrogen | phenyl |
| B-03 | hydrogen | n-hexyl |
| B-04 | hydrogen | p-tolyl |
| B-05 | hydrogen | n-octyl |
| B-06 | hydrogen | p-chlorophenyl |
| B-07 | hydrogen | o-tolyl |
| B-08 | hydrogen | o-chlorophenyl |
| B-09 | hydrogen | p-carboxyphenyl |
| B-10 | hydrogen | 5-carboxy-2-n-hexadecyloxyphenyl |
| B-11 | n-butyl | 2-hydroxyethyl |
| B-12 | phenyl | 2-hydroxyethyl |
| B-13 | o-sulphamoylphenyl | cyclohexyl |
| B-14 | 3-hydroxy-4-carboxyphenyl | cyclohexyl |
| B-15 | p-methoxyphenyl | cyclohexyl |
| B-16 | p-methoxyphenyl | n-butyl |

The blue dye B-01 can be prepared as described in Preparation 1 hereinafter.

PREPARATION 1

A volume of 5 l of dimethylformamide is brought in a 20 l open flanged vessel provided with a mechanical stirrer, a thermometer, a dropping funnel, and a cooling tub. An amount of 949 g (4 mol) of barbituric acid is added with stirring thereto at room temperature. After complete dissolution of the barbituric acid an amount of 569 g (2 mol) of glutaconaldehyde dianilide hydrochloride is added also at room temperature. A volume of 1680 ml of triethylamine is added dropwise at 20°–30° C. with cooling on a mixture of ice and water. The mixture is stirred for 15 min. A volume of 400 ml of acetic anhydride is added dropwise again at 20°–30° C. with cooling on a mixture of ice and water. Stirring is continued for 3 h at 20°–30° C. The reaction mixture is poured out on 12 kg of ice, 12 l of a 25% aqueous solution of sodium chloride, and 1680 ml of hydrochloric acid. The mixture is stirred for 1 h, allowed to stand overnight, and centrifuged. The solid product is stirred for 30 min with 24 ml of hydrochloric acid in 24 l of water and then centrifuged. The product was dried in a drying cabinet at 70° C. until dry.

Yield of dye B-01: (1,5-bis-[1-H-3-(p-methoxyphenyl)-barbituric acid]-pentamethine oxonol): 100%. Melting point: 215° C.

The other pentamethine oxonol-type barbituric acid derivative dyes for use in accordance with the present invention can be prepared analogously.

The absorption characteristics of the pentamethine oxonol-type barbituric acid derivative dyes of Table 5 are listed in the following Table 6. The values of absorption maximum given in Table 6 were measured in solution. In dissolved state these dyes absorb between about 585 and about 605 nm. When measured in dispersed state in gelatin the absorption maximum of these dyes was found to have shifted bathochromically by at least 100 nm.

TABLE 6

| Dye no. | Absorption maximum (in nm) | $\epsilon \times 10^{-5}$ | measured in |
|---|---|---|---|
| B-01 | 590 | 1.28 | methanol |
| B-02 | 590 | 1.29 | methanol |
| B-03 | 588 | 1.52 | methanol/triethylamine |
| B-04 | 598 | 1.65 | dimethylformamide |
| B-05 | 590 | $9.21 \times 10^{-4}$ | methanol/triethylamine |
| B-06 | 598 | 1.57 | dimethylformamide |
| B-07 | 596 | 1.63 | dimethylformamide |
| B-08 | 598 | 1.55 | dimethylformamide |
| B-09 | 602 | 1.05 | dimethylformamide |
| B-10 | 598 | 1.58 | dimethylformamide |
| B-11 | 590 | 1.10 | methanol |
| B-12 | 590 | 1.27 | methanol |
| B-13 | 596 | 1.33 | methanol |
| B-14 | 596 | 1.01 | methanol |
| B-15 | 594 | 1.10 | methanol |
| B-16 | 594 | 1.03 | methanol |

According to a preferred embodiment of the present invention the dye B-01 listed in Table 5 is used as pentamethine oxonol-type barbituric acid derivative dye in dispersed state in the intermediate layer, preferably a gelatin intermediate layer, between the blue-sensitive and the red-sensitized emulsion layers.

According to an even more preferred embodiment of the present invention the dye YM-03 listed in Table 1 is used as merostyryl dye in dispersed state in yellow gelatin-containing antihalation undercoat and the dye B-01 listed in Table 5 is used as pentamethine oxonol-type barbituric acid derivative dye in dispersed state in the gelatin-containing intermediate layer between the blue-sensitive and the red-sensitized emulsion layers.

The yellow merostyryl dyes and/or monomethine oxonol dyes as well as the blue pentamethine oxonol-type barbituric acid derivative dyes used in accordance with the present invention can be incorporated in hydrophilic colloid compositions according to any of the dispersion techniques known for incorporating water-insoluble colour couplers in hydrophilic colloid media.

According to the present invention it is preferred to prepare a dispersion of the yellow merostyryl dyes and/or monomethine oxonol dyes in an aqueous hydrophilic colloic composition by finely grinding the dyes in a mill e.g. a ball mill, a sand mill, or a colloid mill in the presence of one or more dispersing agents; the hydrophilic colloid e.g. gelatin is added after or before the milling process. The dispersion obtained can then be mixed with other ingredients to form a coating composition for the yellow antihalation undercoat of the colour photographic motion picture projection film element of the present invention. Analogously, it is preferred to prepare a dispersion of the blue pentamethine oxonol-type barbituric acid derivative dyes in the same way. The dispersion obtained can also be mixed with other ingredients to form the coating composition for the bluish antihalation intermediate layer of the colour photographic motion picture projection film element of the present invention.

The hydrophilic colloid binder of the layers containing the dyes according to the present invention is usually gelatin. Other hydrophilic colloids such as casein, polyvinyl alcohol, poly-N-vinyl pyrrolidone, sodium alginate, sodium carboxymethylcellulose, etc. can also be used either or not in combination with gelatin.

The transparent film support of the colour photographic motion picture projection film element of the present invention is a film of cellulose triacetate, a polyalkylene terephthalate e.g. polyethylene terephthalate, or polycarbonate.

It may be advisable to provide the transparent film support with a primer coating or a subbing layer before the application of the yellow antihalatation undercoat or to pretreat the support superficially according to known techniques such as an electrical treatment with a high voltage corona, etc. An interesting primer coating for application between a polyethylene terephthalate support and the yellow antihalation undercoat has been described e.g. in U.S. Pat. No. 4,132,552.

According to a preferred embodiment of the present invention the side of the transparent film support of the colour photographic motion picture projection film element, opposite to that carrying the emulsion layers is provided with an antistatic layer comprising an electroconductive polymer e.g. as described in U.S. Pat. No. 4,089,997, preferably an antistatic layer comprising polystyrene sulphonic acid sodium salt. This antistatic layer may comprise polymer beads as described in EP-A No. 0,080,225, these beads protruding from the antistatic layer surface and consequently acting as spacing agents to reduce contact with adjacent surfaces.

The thickness of the yellow antihalation undercoat and of the bluish antihalation intermediate layer is not critical, though generally a thickness of 0.5 to 3 μm is used. The thickness of each of these layers and the amount of the dyes present therein are preferably chosen in such a way that the resulting antihalation layers have an optical density of about 0.5 to about 1.5 as measured in their own absorption range. The amount of the yellow merostyryl dye and/or monomethine oxonol dye in the yellow antihalation undercoat and of the blue pentamethine oxonol-type barbituric acid derivative dye in the bluish antihalation intermediate layer may vary from 750 mg to 10 mg per m2, preferably from 250 to 25 mg per m2.

A bluish dye e.g. a pentamethine oxonol-type barbituric acid derivative dye corresponding to the general formula (III) can in addition to being incorporated into the bluish antihalation intermediate layer, also be present in the red-sensitive emulsion layer and/or the green-sensitive layer.

The following examples illustrate the present invention.

EXAMPLE 1

The yellow merostyryl dye YM-03 was dispersed in gelatin by finely grinding the dye together with gelatin in a ball mill. Water was added to form a coating composition comprising:

| | |
|---|---|
| inert gelatin | 50 g |
| dispersed dye YM-03 | 1 g |
| water to make | 1000 ml |

The pH of the coating composition was adjusted to 6.1. The solution was coated on a subbed cellulose triacetate support so that 2.5 g of gelatin and 50 mg of the yellow dye were present per m2. The yellow gelatin layer obtained was covered with a non-spectrally-sensitized silver chlorobromide emulsion layer comprising an amount of silver halide equivalent to 1.04 g of silver nitrate per m2.

The dye in the yellow gelatin layer showed an excellent fastness to diffusion. No desensitization of the emulsion layer could be measured. Neither did the spectral sensitivity of the emulsion layer change, because the dye had not migrated at all into the emulsion layer and as a consequence could not have exerted any sensitizing effect on it.

During treatment of the resulting element with a common alkaline colour developing bath the yellow dye decoloured completely in but 5 s.

EXAMPLE 2

A dispersion was made of the blue dye B-01 in 2% aqueous gelatin by milling in a swinging mill with a concentration of 250 mg of dye per 100 g of dispersion.

A coating composition was made by adding gelatin and water, the resulting composition containing 5.4 g of the blue dye. The composition was coated on a subbed cellulose triacetate support in such a way that 2.5 g of gelatin and 270 mg of the dye were present per m2. The bluish gelatin layer obtained was covered with a non-spectrally-sensitized silver chlorobromide emulsion layer comprisng an amount of silver halide equivalent to 1.04 g of silver nitrate per m2.

The dye in the bluish gelatin layer showed an excellent fastness to diffusion. No desensitization of the emulsion layer could be measured. Neither did the spectral sensitivity of the emulsion layer change, because the dye had not migrated at all into the emulsion layer and as a consequence could not have exerted any sensitizing effect on it.

During treatment of the resulting element with a common alkaline colour developing bath the blue dye decoloured completely in 1 to 2 min.

EXAMPLE 3

Samples of colour photographic motion picture projection film elements A, B, and C were made. Each sample had a transparent film support, a subbing layer, a blue-sensitive silver halide emulsion layer comprising a yellow-forming coupler, an intermediate gelatin layer, a red-sensitized silver halide emulsion layer comprising a cyan-forming coupler, an intermediate gelatin layer, a green-sensitized silver halide emulsion layer comprising a magenta-forming coupler, and an antistress layer. All samples were identical except for the position and composition of the antihalation layer(s), as explained hereinafter.

Element A additionally carried a carbon black antihalation layer on the back side of the support, the carbon black layer having a thickness of 1 μm and comprising 250 mg of carbon black per m2.

Element B had no carbon black antihalation back layer, but instead had a yellow antihalation undercoat between the support and the blue-sensitive emulsion layer, the yellow antihalation undercoat having a thickness of 1 μm and comprising 250 mg of the yellow dye YM-03 and 0.7 g of gelatin per m2.

Element C had no carbon black antihalation back layer, but instead had an identical yellow antihalation undercoat as in Element B and in addition thereto comprised in the intermediate gelatin layer between the blue-sensitive emulsion layer and the red-sensitized emulsion layer the blue dye B-01 in an amount of 50 mg per m2, the amount of gelatin being 1 g per m2.

Each of the samples, A, B, and C was individually placed in contact with a transparent square wave chart or wedge and exposed to blue and red monochromatic light. After colour development, the values of speed and Modulation Transfer Function (MTF) were measured. These values are listed in the following Table 7.

The values given for the speed are relative values, a value of 100 being given to Element A having the carbon black layer, the value 200 corresponding to a doubling of the speed.

TABLE 7

| Element | Blue-sensitive layer | Speed | MTF value (%) | | | | |
|---|---|---|---|---|---|---|---|
| | | | 2 | 5 | 10 | 20 | 30 lines/mm |
| A | exposed to blue | 100 | 96 | 90 | 63 | 36 | 26 |
| B | exposed to blue | 93 | 98 | 90 | 65 | 37 | 25 |
| C | exposed to | 87 | 99 | 90 | 64 | 35 | 23 |
| | Red-sensitized layer | | 2 | 5 | 10 | 30 | 50  80 lines/mm |
| A | exposed to red | 100 | 91 | 88 | 78 | 59 | 57  44 |
| B | exposed to red | 102 | 88 | 85 | 82 | 65 | 57  48 |
| C | exposed to red | 87 | 92 | 92 | 92 | 77 | 69  61 |

These results demonstrate that the image sharpness obtained in the blue-sensitive emulsion layer of the film element C according to the present invention equals the image sharpness obtained in the blue-sensitive emulsion layer of a comparable film element comprising a carbon black antihalation back layer. In consequence of the presence of the blue intermediate layer in Element C the speed of the blue-sensitive emulsion layer of Element C was lower than that of the corresponding layer in Element A, but was still at a very satisfying level.

It is also demonstrated that the image sharpness obtained in the red-sensitized emulsion layer of the film element C according to the present invention even surpasses the image sharpness obtained in the red-sensitized emulsion layer of a comparable film element comprising a carbon black antihalation back layer. In consequence of the presence of the blue intermediate layer in Element C the speed of the red-sensitized emulsion layer of Element C was also lower than that of the corresponding layer in Element A, but was still at a very satisfying level as well.

We claim:

1. Colour photographic motion picture projection film element comprising a transparent film support and coated thereon in succession, a blue-sensitive silver halide emulsion layer comprising a yellow-forming coupler, a red-sensitized silver halide emulsion layer comprising a cyan-forming coupler, an intermediate layer, a green-sensitized silver halide emulsion layer comprising a magenta-forming coupler, and an antistress layer, wherein between said support and said blue-sensitive silver halide emulsion layer a yellow antihalation undercoat is provided, which comprises at least one yellow non-diffusing dye that absorbs blue light and is removable and/or decolourizable in a processing bath and between said blue-sensitive silver halide emulsion layer and said red-sensitized silver halide emulsion layer a bluish antihalation intermediate layer is provided, which comprises at least one blue non-diffusing dye that absorbs red light and is removable and/or decolourizable in a processing bath.

2. A colour photographic motion picture projection film element according to claim 1, wherein said yellow non-diffusing dye is at least one dye chosen from the group consisting of:

a merostyryl dye corresponding to the general formula (I):

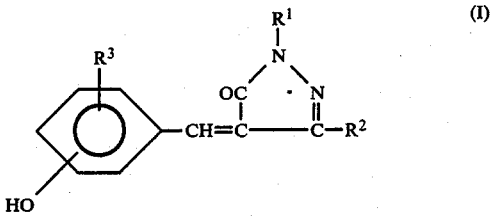

in which:

$R^1$ represents hydrogen, $C_1$–$C_4$ alkyl, aryl, aralkyl, or a heterocyclic group, $R^2$ represents one of the groups represented by $R^1$, carboxy, alkoxycarbonyl, aryloxycarbonyl, carbamoyl, ureido, or sulphamoyl, at least one of $R^1$ and $R^2$ being or containing carboxy or carbamoyl, $R^3$ represents hydrogen, $C_1$–$C_4$ alkyl, or $C_1$–$C_4$ alkoxy, and when $R^3$ is $C_1$–$C_4$ alkyl or $C_1$–$C_4$ alkoxy, it stands in ortho- or para-position in respect of the hydroxy group, which itself is in ortho- or para-position in respect of the methine group, and a monomethine oxonol dye corresponding to the following general formula (II):

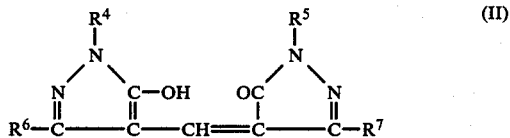

in which:

each of $R^4$ and $R^5$, which may be the same or different, represents: hydrogen, $C_1$–$C_4$ alkyl, aryl, or a heterocyclic group, each of $R^6$ and $R^7$, which may be the same or different, represents: $C_1$–$C_4$ alkyl, carboxy, or carbamoyl, at least one of $R^4$, $R^5$, $R^6$, and $R^7$ being or containing carboxy or carbamoyl, and that said blue non-diffusing dye is at least one pentamethine oxonol-type barbituric acid derivative dye corresponding to the general formula (III):

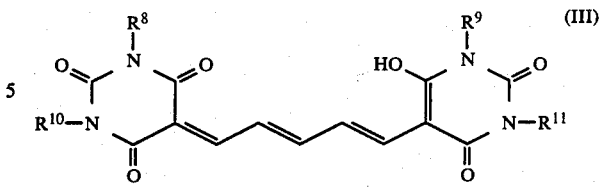

in which:

each of $R^8$ and $R^9$, which may be the same or different, represents: hydrogen, $C_1$–$C_4$ alkyl, $C_1$–$C_4$ alkoxy, or aryl, and each of $R^{10}$ and $R^{11}$, which may be the same or different, represents: one of the groups represented by $R^8$ and $R^9$, or cycloalkyl.

3. A colour photographic motion picture projection film element according to claim 2, wherein said merostyryl dye and/or said monomethine oxonol dye as well as said pentamethine oxonol-type barbituric acid derivative dye are present in dispersed state in a hydrophilic colloid.

4. A colour photographic motion picture projection film element according to claim 3, wherein said hydrophilic colloid is gelatin.

5. A colour photographic motion picture projection film element according to claim 2, wherein a merostyryl dye corresponding to the general formula (I) is used wherein $R^1$ is p-carboxyphenyl, $R^2$ is methyl, $R^3$ is hydrogen, and hydroxy stands in para-position.

6. A colour photographic motion picture projection film element according to claim 2, wherein an oxonol-type barbituric acid derivative corresponding to the general formula (III) is used wherein each of $R^8$ and $R^9$ represents a hydrogen atom and each of $R^{10}$ and $R^{11}$ represents methoxy.

7. A colour photographic motion picture projection film element according to claim 2, wherein a merostyryl dye corresponding to the general formula (I) is used wherein $R^1$ is p-carboxyphenyl, $R^2$ is methyl, $R^3$ is hydrogen, and hydroxy stands in para-position and that an oxonol-type barbituric acid derivative corresponding to the general formula (III) is used wherein each of $R^8$ and $R^9$ represents a hydrogen atom and each of $R^{10}$ and $R^{11}$ represents methoxy.

8. A colour photographic motion picture projection film element according to claim 1, wherein the side of the transparent film support that is opposite to that carrying the emulsion layers is provided with an antistatic layer comprising an electroconductive polymer.

9. A colour photographic motion picture projection film element according to claim 1, wherein the side of the transparent film support that is opposite to that carrying the emulsion layers is provided with an antistatic layer comprising polystyrene sulphonic acid sodium salt.

10. A colour photographic motion picture projection film element according to claim 2, wherein the amount of the yellow merostyryl dye and/or monomethine oxonol dye in the yellow antihalation undercoat and of the blue pentamethine oxonol-type barbituric acid derivative dye in the bluish antihalation intermediate layer varies from 250 to 25 mg per m2.

* * * * *